Jan. 5, 1971 — J. W. GIFFEN — 3,552,941
FORMING HANDLED VITREOUS ARTICLES
Filed Nov. 4, 1968 — 3 Sheets-Sheet 1

INVENTOR.
James W. Giffen
BY
ATTORNEY

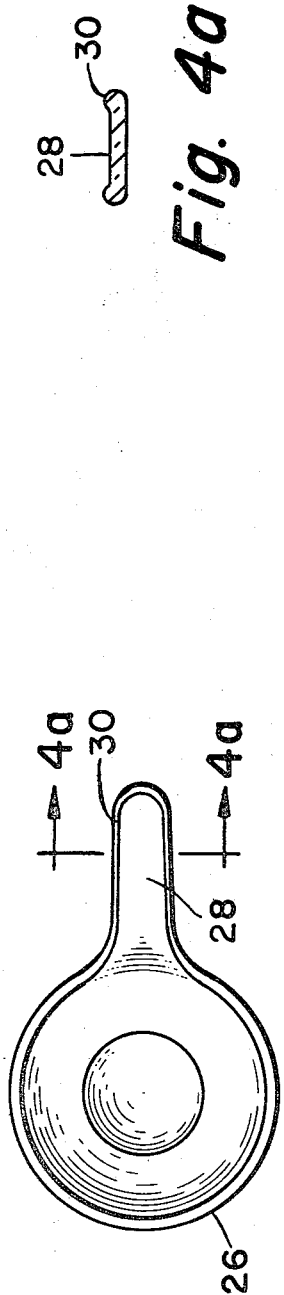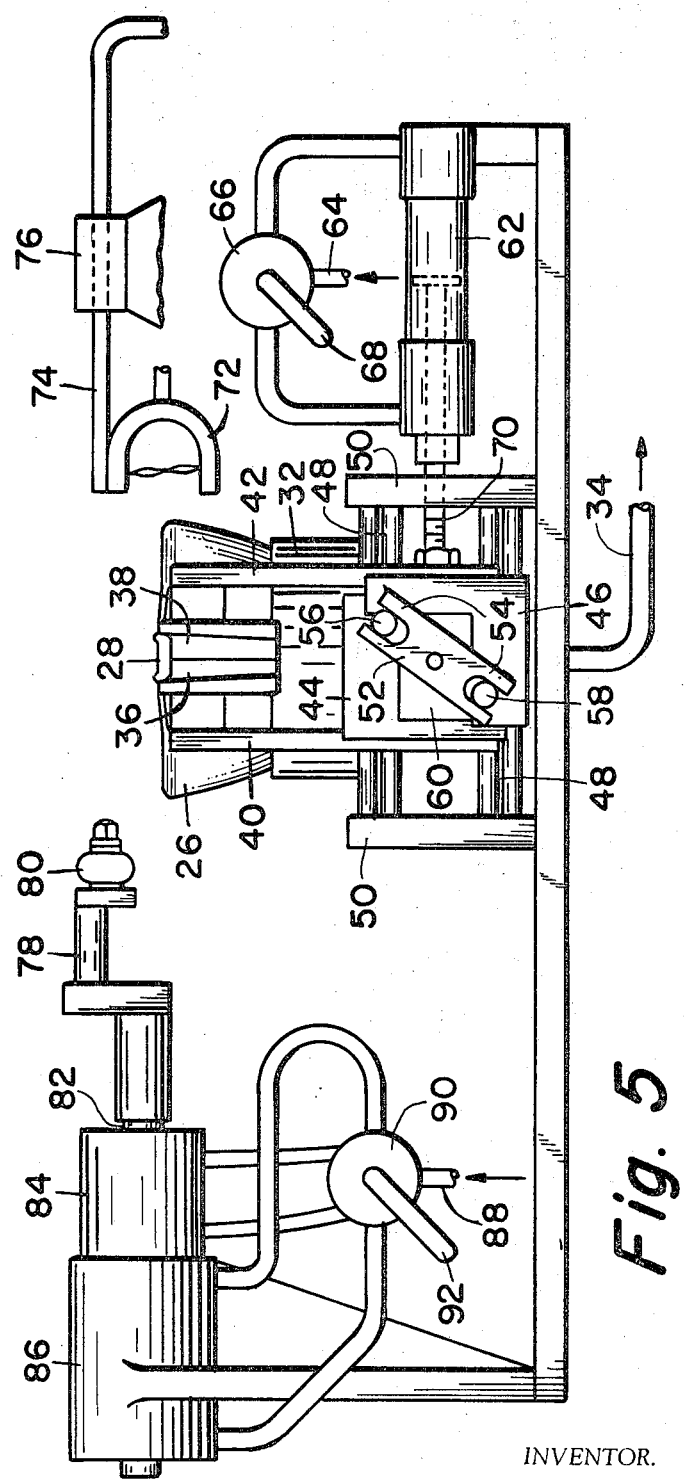

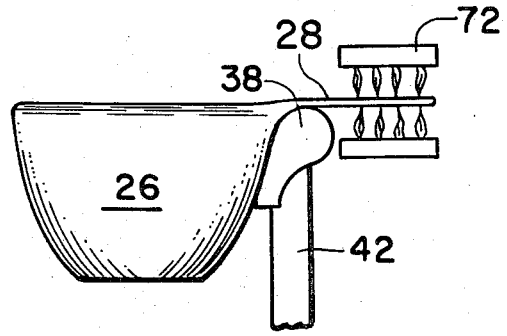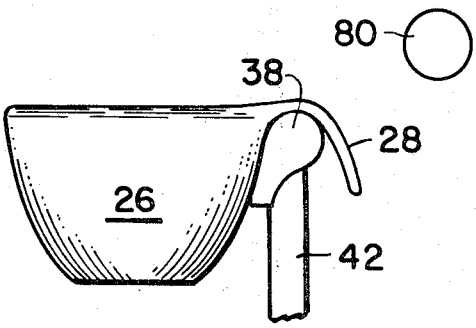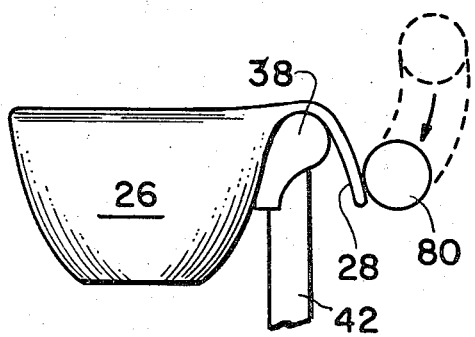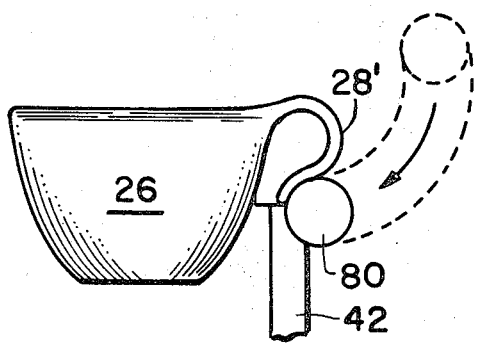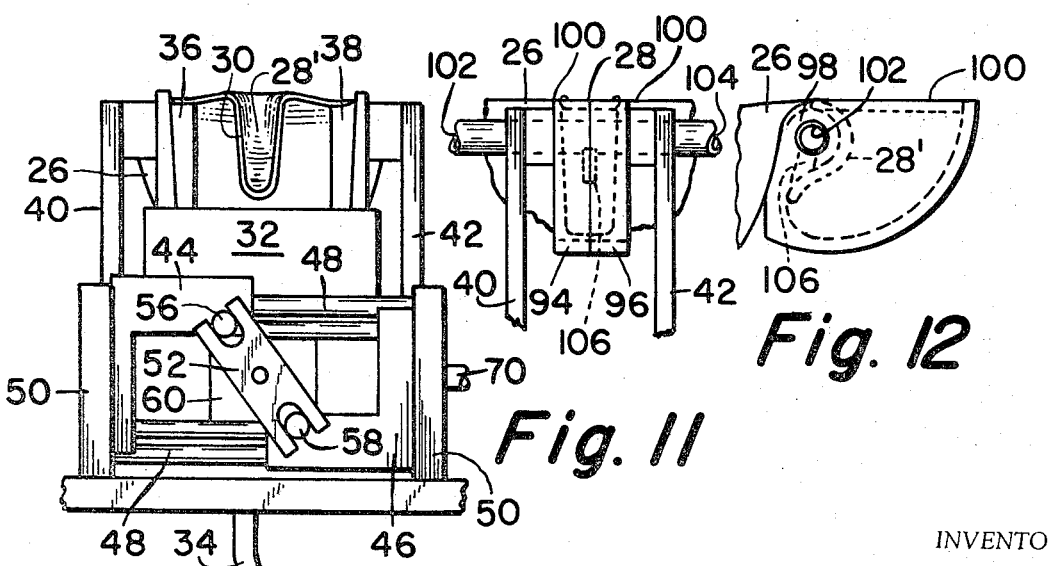

United States Patent Office 3,552,941
Patented Jan. 5, 1971

3,552,941
FORMING HANDLED VITREOUS ARTICLES
James W. Giffen, Corning, N.Y., assignor to Corning Glass Works, Corning, N.Y., a corporation of New York
Filed Nov. 4, 1968, Ser. No. 773,266
Int. Cl. C03b 9/04, 23/02, 23/06
U.S. Cl. 65—67                    11 Claims

ABSTRACT OF THE DISCLOSURE

A cup-shaped article, having dimensionally uniform sidewalls, is formed and trimmed from a sheet of heat-softened glass with a substantially planar integral handle, and the handle is then shaped to a desired form.

BACKGROUND OF THE INVENTION

In the past it has been customary to form handled vitreous articles by pressing charges of molten glass in separable molds. Although commercial production rates are obtainable with the known press-forming process, it has not been completely satisfactory since ridges or parting lines are inherently formed in the article at the junction of the separable mold parts, which require subsequent removal by polishing and grinding operations. In addition, not only is the minimum thickness of the pressed article limited by the operating parameters, but also the handle configuration must be continuous in order to obtain optimum uniformity in glass distribution.

The present invention overcomes these problems encountered with the standard press-forming manufacture of vitreous cup-shaped articles by utilizing a glass sheet of controlled thinness to initially form the cup with an integral handle, and subsequently forming the handle into an open ended configuration.

SUMMARY OF THE INVENTION

The present invention sets forth a novel method and apparatus for forming handled vitreous cup-shaped articles from glass sheet. A sheet of hot pliable glass in a semi-molten or heat-softened condition is positioned over a draw ring surrounding the cavity of a forming mold. The cavity not only comprises a relatively deep cup-shaped portion, but also a shallow handle-portion extending laterally from the rim of the cup-forming cavity portion. Differential pressure is applied to the heat-softened sheet, such as by vacuum, to conform the sheet to the contour of the cup and handle cavity portions. A male trimmer element cooperatively engages an inner edge of the cavity to trim the thus formed cup and handle from the excess sheet of glass, and the handle portion is subsequently reheated and reshaped by bending it into a loop which terminates in spaced relation to the exterior wall surface of the cup.

It thus has been an object of the present invention to provide new method and apparatus for manufacturing vitreous vessels having integral handle portions from sheet glass.

BRIEF DESCRIPTION OF THE DRAWINGS

FIG. 4 is a top plan view of a cup-shaped article as formed and trimmed from sheet material within the apparatus disclosed in FIGS. 1–3.

FIG. 4a is a cross-sectional view in elevation of the cup handle taken along lines 4a—4a of FIG. 4.

FIG. 5 is a somewhat schematic elevational view of apparatus for heating and mechanically bending a cup handle into an open loop configuration.

FIGS. 6 through 9 are side elevational views schematically illustrating the steps employed in shaping an integral handle, formed out of the glass sheet, into an open loop configuration.

FIG. 10 is a fragmental elevational view of a portion of the apparatus disclosed in FIG. 5, in an open or inoperative position, and showing the handle of a cup which has been reshaped.

FIG. 11 is a fragmental elevational view of a further embodiment which is interchangeable with the mechanical reshaping elements illustrated in FIG. 10, but which functions to vacuum form the handle of a cup into the desired open loop shape.

FIG. 12 is a side elevational view of the apparatus illustrated in FIG. 11.

DESCRIPTION OF THE PREFERRED EMBODIMENTS

Figure 1:
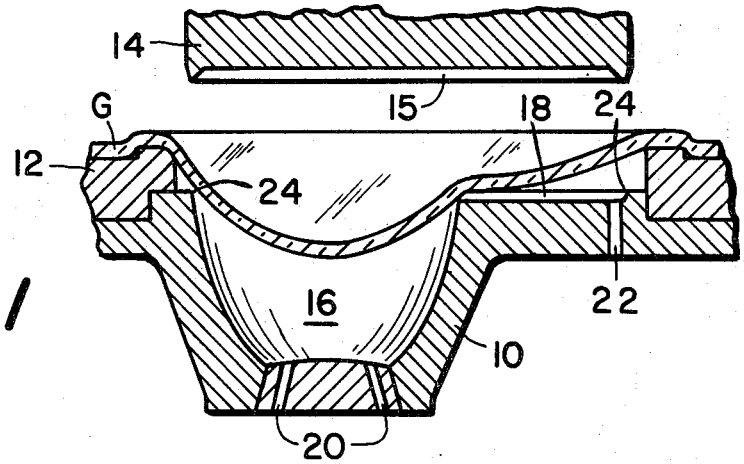
FIG. 1 is a side elevational view in section of mold apparatus embodying the present invention and showing a heat-softened sheet of vitreous material positioned over a draw ring, wherein the sheet has partially sagged due to gravity.
Figure 2:
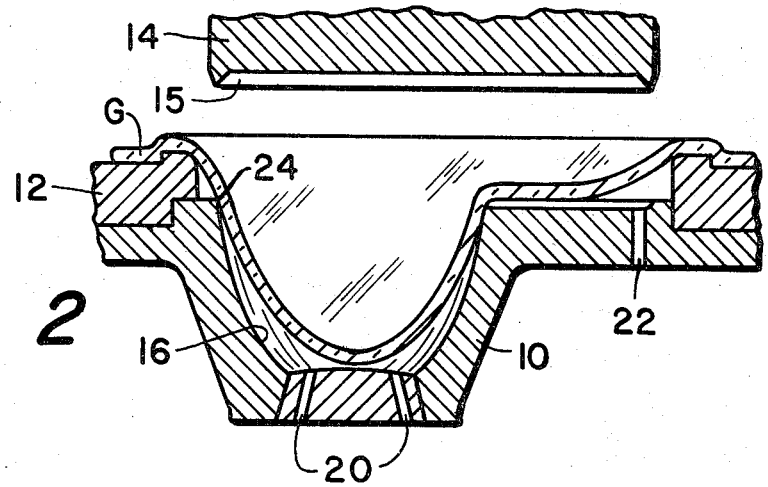
FIG. 2 is a side elevational view in section similar to FIG. 1, but showing a uniform distribution of the sheet in a transitory position as it is initially subjected to the influence of a vacuum applied to the mold.
Figure 3:
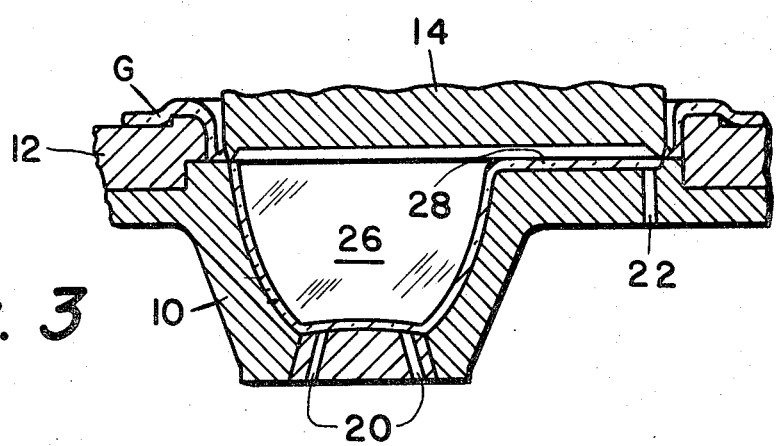
FIG. 3 is a side elevational view in section similar to FIG. 1, but showing the sheet fully conformed to the configuration of the mold cavity and a male trimmer in operative relation with trim edge portions of the cavity to separate the newly formed article from the excess sheet glass.

Referring now to the drawings, and particularly FIGS. 1–3, mold apparatus for forming a cup-shaped article, having an integral handle, from sheet glass is shown comprising a mold 10, a raised draw ring 12, and a male trimmer 14. The mold 10 is provided with a cup-shaped cavity 16 having a relatively shallow handle-forming cavity 18 communicating with a rim portion thereof. Vacuum ports 20, 22, connected to a suitable source of vacuum, communicate with the cup-shaped cavity 16 and the handle-forming cavity 18 to facilitate the vacuum-forming of a heat-softened or pliable glass sheet G positioned over the mold apparatus.

When forming a cup-shaped article from a sheet of hot pliable vitreous material, a sheet of heat-softened glass is positioned over the raised draw ring 12 surrounding the mold cavities 16, 18. As shown in FIG. 1, the sheet immediately begins to sag into the cavity 16 due to gravity. However, since the sheet G is raised above the hardened upper rim or trim edges 24 surrounding the mold cavities, it is free to sag downwardly within the cavity 16 without contacting rim edge portions. As a result, the sheet is permitted to freely and evenly flow downwardly within the cavity so as to produce a cup-shaped article 26 with uniform wall distribution. If it were not for the presence of the raised draw ring 12, the pliable vitreous sheet G would contact the trim edges 24 surrounding the mold cavities, thus causing the sheet to become chilled and setup about these rim portions so that as the remainder of the sheet sagged downwardly into the cavity it would become progressively thinner and produce an unacceptable cup with a very thin bottom surface.

The application of a vacuum to cavities 16 and 18 is momentarily delayed after the positionment of sheet G to permit the sheet to initially freely sag into the mold cavity and thereby provide optimum wall distribution. The vacuum is then applied through ports 20 and 22 to vacuum-form the sheet into the configuration of the mold cavities 16 and 18, as shown in FIG. 3. Immediately after the cup-shaped article is formed, and while the glass is still in a semi-plastic condition, the male trimmer element 14 is lowered into operable engagement with the trim edge portions 24 of mold 10 to trim excess glass sheet from the bordering edge portions of the newly formed cup 26 and its extended handle portion 28. As noted in the drawings, the trimmer 14 is provided with a hollow recessed portion 15 which receives glass displaced during the trimming operation and forms a strengthening ridge or bead 30 about the border of the handle portion 28 (see FIGS. 4 and 4a). After trimming, the article is removed from the mold and the handle portion is subsequently formed into an open loop shape by means of apparatus described hereinafter.

FIGS. 5 and 10 illustrate one form of apparatus which may be utilized to contour planar handle portion 28 into an open loop. A cup-shaped article 26 is retained in position on a support 32 by vacuum applied thereto in a customary manner by means of a suitably valved vacuum line 34. A pair of horizontally separable mandrels 36 and 38, having a contoured configuration for shaping the handle portion 28 of the cup 26, are mounted on vertically disposed supports 40 and 42, which are in turn respectively connected to slide blocks 44 and 46. The slide blocks 44 and 46 are slidably mounted upon guide rods 48 which are retained by support frames 50. A forked member 52 having bifurcated end portions 54 which engage pins 56, 58 on slide blocks 44 and 46, respectively, is pivotally connected to a stationary block 60. The member 52 effects a uniform opposed sliding motion of the slide blocks so as to open and close the separable mandrels 36, 38 about a parting line located centrally of the handle portion to be shaped thereby. A cylinder 62, provided with operating fluid from a supply line 64 via a valve 66 having an operating handle 68, has a piston rod 70 operably connected to slide block 46.

A burner assembly 72 is shown mounted upon a slide bar 74 which is slidably retained by support 76 to relatively move the burner assembly into and out of operative position with handle portion 28.

A bell crank 78, having a contoured roller 80, is connected to a rotatable shaft 82 for rolling a heat-softened handle portion 28 about the contour of mandrels 36 and 38 to effect the shaping of the handle. Rotatable shaft 82 extends outwardly from a rotary cylinder 84, which in turn is moved longitudinally by a fluid cylinder 86. As shown, the cylinders 84 and 86 are provided with operating fluid from a suitable supply line 88 via a valve 90 having an operating handle 92.

In operation, with the slide blocks 44, 46 and separable mandrels 36, 38 in an open or inoperative position as shown in FIG. 10, a cup-shaped article 26 having a handle portion 28 to be reshaped into an open loop is positioned within cup support or holder 32, and a vacuum is applied to line 34 to maintain the cup in position within the holder. Valve 66 is then operated to supply fluid to cylinder 62 so as to move piston rod 70 outwardly and thus effect a closing of the separable mandrels 32, 38 along a parting line centrally of the handle portion 28. That is, as cylinder 62 moves the slide block and separable mandrels from their open positions shown in FIG. 10 to the closed position shown in FIG. 5, slide block 46 is moved along guide rods 48 by piston 71 and pivots the forked member 52 by means of pin 58. As the member 52 pivots about fixed block 60, the bifurcated end 54 engaging pin 56 functions to slide block 44 along guide rods 48 toward block 46. Accordingly, mandrels 36 and 38, secured to vertical supports 40 and 42, respectively, are uniformly moved toward one another so as to form a recessed shaping cavity beneath the handle portion 28 of the cup 26 retained by cup support holder 32.

The burner assembly 72 is then relatively moved into operative position so as to direct flames against the surface portions of handle portion 28. As the handle portion reaches its working temperature from the heat applied by burner assembly 72, the handle begins to sag by gravity, and the burner assembly is relatively removed from its operative position with the handle portion. Valve 90 is then actuated in sequence so as to first longitudinally position the roller 80 in alignment above handle portion 28 and then rotate the bell crank 78 so as to reshape the handle over the mandrels 36 and 38.

As shown schematically in FIGS. 6–9, the burner assembly 72 applies heat to the handle portion 28 (FIG. 6) until the handle portion reaches its working temperature wherein the burner assembly is removed and the handle portion 28 begins to sag downwardly over the separable mandrels (FIG. 7). The cylinder 86 is then actuated to longitudinally position the roller 80 above the handle portion 28 and rotary cylinder 84 is actuated to rotate the bell crank 78 and pivot roller 80 downwardly so as to roll the handle portion 28 completely around the desired contour of separable forming mandrels (FIGS. 8 and 9).

Valve 90 is then further operated to reverse the rotation of bell crank 78 and withdraw the longitudinal position of the roller 80. Valve 66 is also operated after the handle has cooled to open the separable mandrels 36 and 38 to the position shown in FIG. 10, wherein the cup 26 having a newly formed handle 28' may be removed from support holder 32 upon discontinuance of the vacuum applied thereto.

FIGS. 11 and 12 disclose a further embodiment of the present invention for vacuum-forming the handle portion 28 into a formed handle 28'. In such embodiment the bell crank roller mechanism is eliminated, and vacuum forming chambers 94 and 96 are substituted for separable mandrels 36 and 38. Accordingly, the activation of cylinder 62 will open and close the vacuum forming chambers 94 and 96 through vertical supports 40, 42 and slide blocks 44, 46 in the same manner that separable mandrels 36 and 38 are operated. Each vacuum forming chamber has a mandrel portion 98 about which handle portion 28 is formed, and jointly are the functional equivalent of mandrels 36 and 38. The vacuum forming chambers 94 and 96 are provided with upper handle bordering portions 100 which are engageable with the handle portion 28 for centering and aligning the handle portion with the composite chamber opening formed by the chambers 94 and 96. As shown, suitable vacuum lines 102 and 104 are in communication with the interior of the vacuum forming chambers 94 and 96 via slots or passages 106 formed in the mandrel portions 98.

When reshaping a handle portion 28 by means of the vacuum apparatus, the handle is subjected to heat by a suitable burner until it reaches its working temperature and begins to sag into the forming cavity. Vacuum is then applied to the composite chamber formed by chambers 94 and 96 by vacuum lines 102 and 104 through slots 106 to vacuum-form the handle portion 28 into conformity with the mandrel portions 98, so as to form an open loop shaped handle 28'. After the handle cools to a semi-rigid state, the vacuum is released from the composite chamber, the separable chambers 94 and 96 opened by means of cylinder 62, and the vacuum is released from support 32 so that the finished cup may be removed from the apparatus.

As a specific example of the formation of a handled cup, a .220 inch thick sheet of heat-softened or semi-molten glass at a viscosity of about 8000 poises was positioned over the top surface of a draw ring raised ⅝ inch above the upper surface of a mold. The mold had a cup-shaped cavity of 2$\frac{7}{16}$ inches and a handle forming cavity of ⅛ inch communicating with a rim edge portion of the cup-shaped cavity. Initially the cavities were freely vented to the atmosphere to prevent a buildup of gases therein and may even be provided with a slight vacuum of about 3 inches Hg to eliminate such gases and allow the sheet to sag into the cup cavity by gravity so as to provide uniform wall distribution. About 3 seconds after the sheet was positioned upon the draw ring and had sagged into the cavity, a forming vacuum of about 18 inches Hg was applied to the mold cavities to simultaneously form the cup and handle portions of the article from the sheet. Approximately .1 second after forming, the trimmer element was lowered to trim the newly formed cup and handle portion from the excess glass sheet. Positive pressure may be applied through the trimmer element at this time if desired to facilitate forming.

The cup with its planar handle portion was then positioned in apparatus shown in FIGS. 5 and 10. Flame burners were applied for about 8 seconds to raise the handle portion to a working temperature of about 850° C. The handle began to sag by gravity over the mandrels, and the burners were removed. The cylinders were then activated to immediately form the softened handle portion over the mandrels into an open loop shape. After cooling to about 400° C., the mechanism was opened and the finished cup-shaped article with an integral open loop handle was removed therefrom. When forming the handle by the vacuum apparatus shown in FIGS. 11 and 12, heat was applied as before; however, a vacuum of about 20 inches Hg was applied to the vacuum forming chambers to vacuum form the handle portion into an open loop configuration about the mandrels.

Although the preferred embodiments have been disclosed, it will be apparent to those skilled in the art that various modifications and changes may be made thereto without departing from the scope of the invention.

I claim:

1. A method of forming a deep drawn article having uniform wall distribution from a sheet of heat-softened vitreous material which comprises, positioning a sheet of vitreous material in vertically spaced-apart relationship above a forming cavity, gravitationally sagging such sheet material while in a heat-softened condition partially within said forming cavity while simultaneously maintaining such sheet material in spaced-apart relationship from rim edge portions of such cavity, and then applying a vacuum within the forming cavity to conform the uniformly distributed sheet material to the contour of the cavity and thereby produce a deep drawn glass article with uniform wall distribution.

2. A method as defined in claim 1 including the steps of vacuum-forming a portion of said heat-softened sheet glass into a shallow cavity communicating with a rim edge of the forming cavity simultaneously with the application of the vacuum to the forming cavity to form an integral handle portion on the article, and trimming excess glass sheet from about the article and its handle portion.

3. A method of forming an article as defined in claim 1 wherein the horizontal handle portion is subsequently heated to its forming temperature and shaped about a mandrel into an open loop configuration terminating in spaced relation to the article.

4. A method of forming an article as defined in claim 2 wherein a bead of heat-softened glass is forced about an edge of the handle portion as it is trimmed from the excess glass sheet to form a strengthening rim around the edge portions of the handle.

5. A method of forming an article as defined in claim 2 wherein the trimming of the excess glass from the article and its handle portion is effected by engaging upper edge portions of the cavities with a male trimmer.

6. A method of forming a curvilinear handle on a vitreous cup-shaped article having a substantially horizontal handle portion extending outwardly from a rim edge thereof which comprises, heating the handle portion to a working temperature, initially sagging such heat-softened handle portion about a mandrel, applying force to conform such handle portion to the contour of such mandrel, and cooling the handle to retain its newly formed shape.

7. A method of forming a curvilinear handle on a cup-shaped article as defined in claim 6 including the steps of removing the applied heat when the handle reaches its working temperature, and mechanically rolling the handle portion about the mandrel after it has initially sagged thereover.

8. A method of forming a curvilinear handle on a cup-shaped article as defined in claim 6 wherein a vacuum is applied to conform the initially sagged handle portion into the contour of the mandrel.

9. Apparatus for reshaping a handle portion of a vitreous article wherein the handle portion extends laterally from a rim thereof which comprises, means for supporting the article, means for heating the handle portion thereof to a heat-softened working temperature, separable mandrel means, means for removably positioning said separable mandrel means below said laterally extending handle portion, means for applying force to said heat-softened handle portion for conforming said handle portion to the contour of said mandrel means and thereby reshape said handle portion to a desired contour.

10 Apparatus as defined in claim 9 wherein said force applying means includes a bell crank having a roller on one end thereof for rolling the heat-softened handle portion about said mandrel means, and means for actuating said bell crank.

11. Apparatus as defined in claim 9 wherein said force applying means includes a vacuum forming chamber surrounding said mandrel means, and said mandrel means having vacuum passages extending therethrough to vacuum-form said heat-softened handle portion into the contour of said mandrel.

References Cited

UNITED STATES PATENTS

| | | | |
|---|---|---|---|
| 2,699,014 | 1/1955 | Van Steenis | 65—107X |
| 3,136,619 | 6/1964 | McRoberts et al. | 55—107 |
| 3,177,060 | 4/1965 | Pederson | 65—273X |

ARTHUR D. KELLOGG, Primary Examiner

U.S. Cl. X.R.

65—70, 105, 107, 177, 275, 286, 300